US008205262B2

(12) United States Patent
Bird (10) Patent No.: US 8,205,262 B2
(45) Date of Patent: Jun. 19, 2012

(54) HARDWARE SUPPORT FOR COMPUTER SPECIATION

(76) Inventor: Peter L. Bird, Ann Arbor, MI (US)

( * ) Notice: Subject to any disclaimer, the term of this patent is extended or adjusted under 35 U.S.C. 154(b) by 1195 days.

(21) Appl. No.: 11/749,612

(22) Filed: May 16, 2007

(65) Prior Publication Data

US 2007/0294769 A1    Dec. 20, 2007

Related U.S. Application Data

(60) Provisional application No. 60/747,391, filed on May 16, 2006.

(51) Int. Cl.
*G06F 11/00* (2006.01)
(52) U.S. Cl. .................................................. 726/24
(58) Field of Classification Search ............ 726/24
See application file for complete search history.

(56) References Cited

U.S. PATENT DOCUMENTS

| | | | |
|---|---|---|---|
| 6,401,210 B1 | 6/2002 | Templeton | |
| 6,519,702 B1 * | 2/2003 | Williams | 726/23 |
| 6,842,862 B2 * | 1/2005 | Chow et al. | 713/190 |
| 6,901,519 B1 | 5/2005 | Stewart et al. | |
| 7,036,024 B2 * | 4/2006 | Watson | 726/22 |
| 7,493,483 B2 * | 2/2009 | McIntosh | 713/2 |
| 2004/0123136 A1 | 6/2004 | Jung | |
| 2005/0188218 A1 * | 8/2005 | Walmsley et al. | 713/200 |
| 2007/0022414 A1 | 1/2007 | Bird | |
| 2007/0106981 A1 | 5/2007 | Bird | |
| 2009/0133123 A1 * | 5/2009 | Radha et al. | 726/24 |

FOREIGN PATENT DOCUMENTS

KR    1020030059565    7/2003

OTHER PUBLICATIONS

International Search Report prepared by the Korean Intellectual Property Office as International Searching Authority, dated Nov. 15, 2007 for international application No. PCT/US2007/069075, 3 pages.
Written Opinion of the International Searching Authority prepared by the Korean Intellectual Property Office as International Searching Authority, dated Nov. 15, 2007 for international application No. PCT/US2007/069075, 5 pages.

* cited by examiner

*Primary Examiner* — Kambiz Zand
*Assistant Examiner* — Teshome Hailu
(74) *Attorney, Agent, or Firm* — Hamilton, DeSanctis & Cha (57) ABSTRACT

A system for disrupting malware includes a transform function and its inverse transform function which, when applied serially to an original bit pattern will return the original bit pattern, but when applied in solo will result in a bit pattern which is different than the original bit pattern, a preprocessor configured to apply the transform function in order to transform each benign program received from the computer-readable medium from an architecturally standardized form into a locally-specific form prior to storage of the program code in the program memory; a postprocessor configured to apply the inverse transform function in order to inversely transform all programs prior to their execution, such that previously transformed benign programs are converted back to the architecturally standardized form and malicious programs are rendered dysfunctional for their intended purpose. A method includes operations for serially transforming and inversely transforming authorized programs, but only inversely transforming unauthorized programs.

36 Claims, 6 Drawing Sheets

HARDWARE SUPPORT FOR COMPUTER SPECIATION

CROSS-RELATED REFERENCES

This application claims the benefit of Provisional Application No. 60/747,391, filed May 16, 2006, and entitled "Hardware Support for Computer Speciation", which is hereby incorporated by reference for all purposes.

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever. Copyright © Hercules Software, LLC 2006-2007.

FIELD

Embodiments of the present invention generally relate to systems and methods for eliminating the distribution capabilities of computer viruses across modern computer networks and more specifically to providing relatively unique computing platforms using hardware support structures.

BACKGROUND

One benefit of standardization within any domain is the regularity and commonality that makes product development more cost efficient. For example, the "learning curve" for design techniques can be amortized across a number of products and product releases, thus reducing the overall development cost. Manufacturing efficiencies may also be achieved. For example, common parts and/or components may be used for construction. This commonality allows the manufacturing to be organized in such a fashion as to exploit a common infrastructure as well as purchases of the common elements in volume that may also reduce the overall system cost. Furthermore, when a standard is adopted, the end-users of a standardized product line may become productive more quickly. One reason is the "learning curve" for their product usage is reduced since the end-users may already be familiar with a given model or a previous version that is substantially similar.

In addition to benefits in development and usage, another benefit to standardization exists in maintenance across product lines. One reason is that the maintenance of standardized product lines becomes easier since there is a common, standard model for the range of products. Although the discussion above is most relevant to physical (e.g., hardware) manufacturing, it is certainly true that all these points are also applicable to the development of widely used software applications.

Unfortunately, there are several problems that may occur with standardization in both physical manufacturing and software applications. One problem with standardization has to do with defects. If the standard model used for manufacturing has a defect, then all of the reproduced instances of the model will share the common defect. This is especially problematic in ubiquitous software environments. When a security defect becomes public knowledge, then hackers may exploit the vulnerability in system instances that have not had the defect repaired.

The use of a standard operating environment across the millions of machines in use today has created a computational monoculture. Another problem with computational monocultures has to do with the operation of malicious programs. By definition, a program that works on one instance of a standard environment will work on any instance of that environment.

Computer viruses exploit the computational mono-culture in two ways: (1) publicly revealed security breaches are likely to be uncorrected in a large percentage of machines which are operated by security illiterate individuals; and (2) any malicious program (payload) built to exploit the breach will probably run on a large number (millions) of machines with the installed software. Once a computer virus gets past the security perimeter of the victim machine, the payload (a program) may divert the victim machine to the virus writer's intentions. For example, the victim machine may be used for the malicious destruction of information (vandalism), identity theft, espionage (theft of intellectual property), use of the victim computer as a zombie, for use in distributing spam, or to participate in a coordinated distributed denial of service (DDOS) attack.

The effort to develop and distribute a computer virus is facilitated by the computational monoculture that currently exists. Although the effort to build a single virus instance (which can bypass existing security capabilities) may be high, the effort is rewarded because the virus can propagate across the monoculture. This is one of the inherent problems of standardization of computer platforms.

In addition to the problem of standardization of computer platforms, a social engineering aspect of computer security exists which cannot be easily solved simply through technical means. For example, individuals can be deceived by an attacker to reveal information that might permit a hacker to breach a security perimeter. When such a breach is achieved upon the given machine, the payload may propagate across other machines that share a common network with the breached machine.

Current anti-virus software has provided one possible solution to protecting computers from attacks. However, one problem with the current anti-virus software is the problem of trying to detect malicious patterns in programs from the range of possible patterns found within all programs. Most anti-virus programs are inherently reactive, since a pattern is only known about after an infection has been established, recorded and analyzed. In addition, the failure of anti-virus systems may be expensive. Hence, the current limitations of the current anti-virus software with their system of updates of the virus pattern set, the computational overhead of continually scanning the computer to search for malicious patterns, and the expense of failure are significant limitations in the protection of computer systems.

Note that it is impossible to completely secure a computer against all forms of malware infestation, especially when physical access to the target computer is provided to the cracker, and when social engineering techniques can be brought to bear upon the target.

SUMMARY

Systems and methods are described for disrupting the execution and distribution capabilities of computer viruses across computer networks and devices. According to one embodiment, an execution environment of a standardized computer system is transformed making the computer system appear unique (or non-standard) to an incoming virus. A protected pre-execution process having a diversity mechanism incorporated therein is provided within the computer system. Responsive to installation of an authorized computer program, the authorized computer program is registered for execution on the computer system by transforming the authorized computer program from an original form into a locally unique form based on the diversity mechanism. Prior to or during the execution of each program within the protected computer, the computer program is inversely transformed using an inverse of the diversity mechanism. If the computer program was previously transformed through registration, then the inverse transformation based on the diversity mechanism results in an executable program that will execute properly on the computer system; otherwise the inverse transformation results in an executable program that will fail to correctly execute on the computer system.

An embodiment of a system for disrupting malware includes a transform function and its inverse transform function which, when applied serially to an original bit pattern will return the original bit pattern, but when applied in solo will result in a bit pattern which is different than the original bit pattern, a preprocessor configured to apply the transform function in order to transform each benign program received from the computer-readable medium from an architecturally standardized form into a locally-specific form prior to storage of the program code in the program memory; a postprocessor configured to apply the inverse transform function in order to inversely transform all programs prior to their execution, such that previously transformed benign programs are converted back to the architecturally standardized form and malicious programs are rendered dysfunctional for their intended purpose. A method includes operations for serially transforming and inversely transforming authorized programs, but only inversely transforming unauthorized programs.

The protected computer system implements a diversity mechanism (or speciation mechanism) comprised of a TRANSFORM function and an INVERSE TRANSFORM function. These functions are applied in series to the instruction stream of computer programs to be run on the computer. The composite function of the TRANSFORM and its INVERSE implements the identity function: that is, when the TRANSFORM and its INVERSE are applied in series to an instruction stream, the result is the original instruction stream. However, application of either the TRANSFORM or its INVERSE alone will result in an instruction stream that is different than the original instruction stream. A very wide range of TRANSFORMS and INVERSE TRANSFORMS can be used to implement a diversity mechanism.

According to some embodiments, the class of TRANSFORM and INVERSE TRANSFORM functions used by a computer architecture may include a number of distinct implementations. In such embodiments each distinct implementation effectively represents a distinct computer instruction set, and thus, a locally unique form of a computer system.

According to some embodiments, the class of TRANSFORM and INVERSE TRANSFORM functions used by a computer architecture has a large number of distinct implementations. In such embodiments the large number of (possibly) different locally unique forms of the instruction set creates a "relatively" heterogeneous computational environment across a network of interconnected computers.

According to one embodiment, benign programs (e.g., programs which are designated as trustworthy by the administrators of the computer system, programs that are from a known trustworthy source, or programs that have any other indication of being harmless) are registered by applying the TRANSFORM to the instruction stream to create the locally unique form of the program. This form can be saved (or persisted) on the disk drive of the computer. When the locally unique form of the program is executed, that instruction stream is transformed using the INVERSE TRANSFORM function before the instructions are executed.

In accordance with various embodiments programs that are not authorized to be run on the computer are not transformed to the locally unique form. Prior to execution of code in any selected program, an inverse transform is applied. Because unauthorized programs are not transformed, inverse transformation of the unauthorized programs converts the instructions of the unauthorized program into a disrupted form.

The application of the TRANSFORM and the INVERSE TRANSFORM in series to a program will result in the original instruction stream, and thus the intended semantics of the original program are preserved.

In some embodiments only one of the TRANSFORM or the INVERSE TRANSFORM is applied to an instruction stream of unauthorized programs, such that the intended semantics of the program will be distorted. The distortion of the instruction stream renders the unauthorized program unable to operate as intended. Given that the behavior of most computer programs is extremely sensitive to changes in its instructions, it is highly unlikely that a program so changed will perform as desired.

A more complete understanding of the present invention may be derived by referring to the detailed description of preferred embodiments and claims when considered in connection with the figures.

BRIEF DESCRIPTION OF THE DRAWINGS

FIG. 5b is a diagram that shows the values of the three byte patterns found in FIG. 5a.

DETAILED DESCRIPTION

Embodiments of the present invention relate to systems and methods for computer speciation to disrupt malware that benefits from a computer monoculture. By creating thousands (or millions) of distinct "species" of computers the computer monoculture can be broken, thus disrupting malware execution, complicating malware production and stopping automated malware propagation. This can be accomplished without sacrificing the benefits of standardization.

A system for disrupting malware includes a transform function and its inverse transform function which, when applied serially to an original bit pattern will return the original bit pattern, but when applied in solo will result in a bit pattern which is different than the original bit pattern, a preprocessor configured to apply the transform function in order to transform each benign program received from the computer-readable medium from an architecturally standardized form into a locally-specific form prior to storage of the program code in the program memory; a postprocessor configured to apply the inverse transform function in order to inversely transform all programs prior to their execution, such that previously transformed benign programs are converted back to the architecturally standardized form and malicious programs are rendered dysfunctional for their intended purpose. A method includes operations for serially transforming and inversely transforming authorized programs, but only inversely transforming unauthorized programs.

Prior to describing particular embodiments in detail, some useful terminology is provided.

Terminology

The term "code" is interchangeable with the term "instruction", and both refer to the organization and the opcode and register numbering for machine instructions which execute on the given, standardized computing platform.

The phrase "diversity mechanism" generally refers to a mechanism which provides a means to differentiate individual computing devices, with the goal of complicating the development and distribution of computer malware. According to one embodiment, the diversity mechanism has an effect upon the operational behavior of a program by affecting loading or execution, for example. If a program to be run upon a computer does not conform to the structure of the given computer, due to the diversity mechanism, then that program will not operate in correspondence to its intended behavior. Instead the program will almost certainly produce an immediate error in execution. In accordance with most embodiments, a diversity mechanism is enforced by a trusted and restricted (i.e., protected) component (hardware or software) of the computer. In some embodiments, a diversity mechanism is integrated into the operational framework of the computer so that any program to be executed must first pass through the diversity mechanism before being permitted to execute. For example, a diversity mechanism may be incorporated into the interface with the loader, within the instruction decoder, within the virtual memory structure of a computer system and/or the like. Also, according to various embodiments, a diversity mechanism might be applied at the beginning of program execution, or it could be applied continually during the course of program execution. In some cases, the diversity mechanism may be applied using hardware, software, or a combination thereof. For example, one embodiment of a diversity mechanism is a mechanism capable of encrypting a computer file, code, or set of instructions. Examples of diversity mechanisms include, but are not limited to, transformations, such as encryption and encoding. Furthermore, a diversity mechanism may refer to multiple encryption or encoding schemes and appropriate implementations employed at different stages and/or levels. In some embodiments, different encryption levels or schemes may be applied depending on the character of the information being encrypted, e.g., data, instruction set, trust level, and/or the like.

The term "encryption" or "encoding" generally refers the process of applying a reversible transformation to a set of information or data thus masking the information or data. In some embodiments, the encryption is cryptographically strong. In some embodiments, the encryption is not cryptographically strong, e.g., a shuffle algorithm.

The phrases "locally unique form", "locally-specific form" and "local representation" generally refer to the form in which a program and/or libraries are encoded and stored for a particular local computing environment. In one embodiment, the locally unique form is based upon a "relatively" unique element associated with the particular computing environment. In one embodiment, the relatively unique element comprises a "diversity" mechanism incorporated into the system linker/loader which provides a security feature by preventing proper execution of executable programs that have not been properly transformed to accommodate the system linker/loader. In one embodiment, the locally unique form is created during a registration process which may be activated during program installation. The registration process may encode the program to place it in a form that is consistent with a local decoding process implemented within the system linker/loader prior to execution. In one embodiment, the locally unique form is created by transforming the opcodes of the executable instructions.

The term "malware" generally refers to programs which are installed onto a user's computer system without the user's knowledge or understanding, and which, when operational, perform operations which are destructive of information on the computer, and/or may utilize resources of the computer for purposes other than the intent of the computer owner. Examples of malware include, but are not limited to, viruses, spyware, trojans, adware and other malicious computer programs.

The term "program" is interchangeable with the terms "subroutine", "function", "routine" or "module". In some contexts in this document, the term "code" may be a shorthand for a sequence of machine instructions which represent a "function", "subroutine" or "program". In various embodiments described in this document, a "program" may represent a collection of functions, subroutines or modules. Generally, however, these terms refer to any file that contains information that may be interpreted by a computer system as an executable program. Examples may include executable objects, file system objects, script files and/or the like. Furthermore, code objects, such as visual basic scripts, java scripts, Windows®-based scripts, java applets, and/or the like, are intended to be encompassed by the phrases "program," "subroutine," "function," "routine," and "module." Common file extensions of executable objects include, but are not limited to, .exe, .com, .sys, .dll, .scr, .cpl, .api, .drv, .bpl and/or the like. File system objects include objects like device drivers, network interfaces, and/or the like. Other examples of "programs," "subroutines," "functions," "routines," and "modules." may include files using the IEEE-695 standard, S-records, PEF/CFM Mach-O (NeXT, Mac OS X), a.out (Unix/Linux), COFF (Unix/Linux), ECOFF (Mips), XCOFF (AIX), ELF (Unix/Linux), Mach-O (NeXT, Mac OS X), Portable Executable, IBM 360 object format, NLM, OMF, SOM (HP), XBE (Xbox executable), and/or the like.

The term "preprocessor" refers to a system or process that performs a transformation on a program or a portion of a program. In some embodiments the preprocessor is a software module. In various embodiments, the preprocessor transforms only programs that are authorized for execution on the computer.

The term "postprocessor" refers to a system that performs an inverse transform on programs or portions of programs. The inverse transform is the inverse of the transform performed by the preprocessor. The postprocessor inversely transforms program instructions after the preprocessor performs the transformation but prior to execution of the instructions by a central processing unit. In some embodiments, the postprocessor is a part of the CPU.

The term "responsive" includes completely or partially responsive.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

Figure 1:
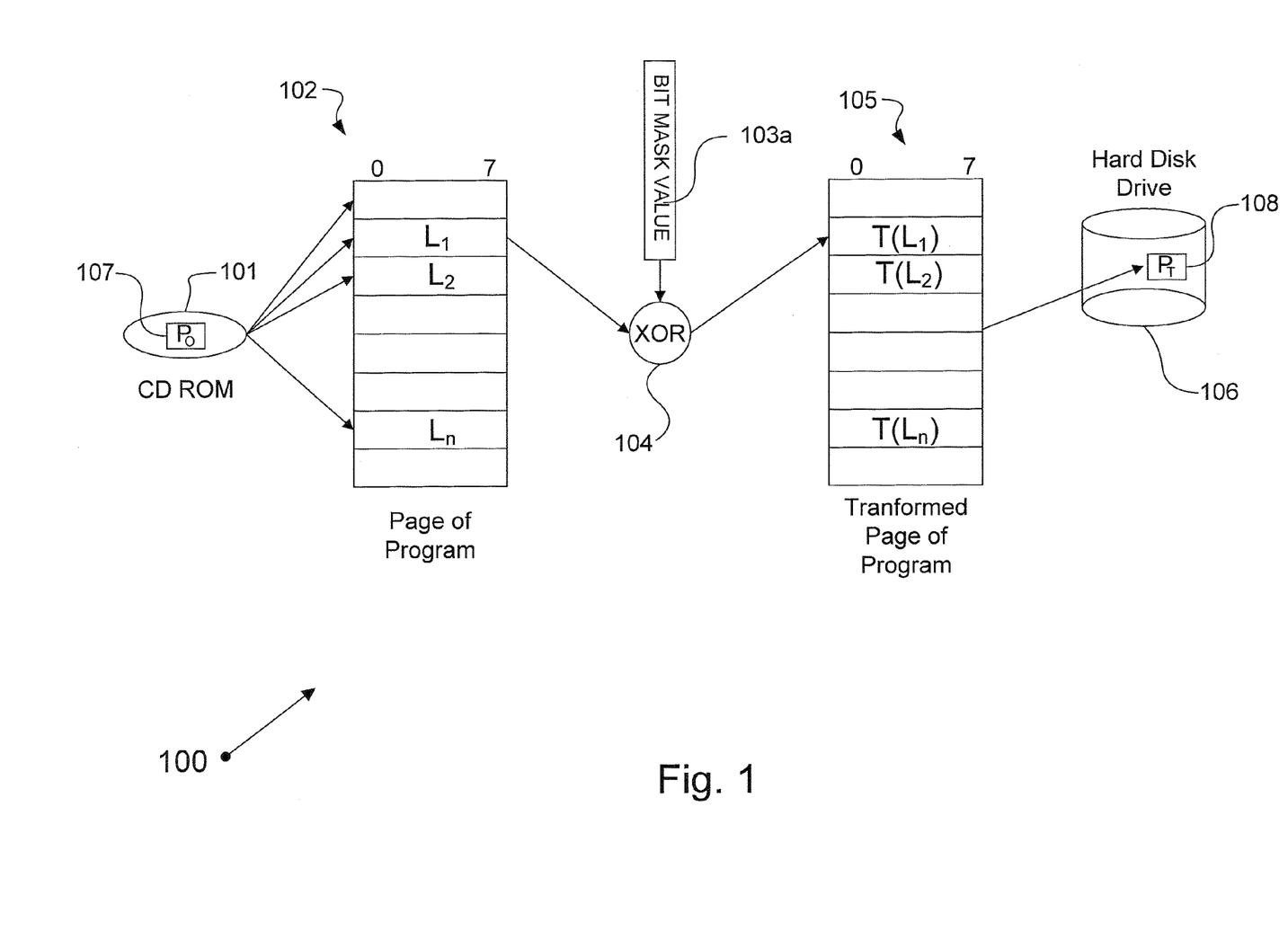
FIG. 1 is a diagram that illustrates components used to carry out an exemplary registration process.

FIG. 1 illustrates components used to carry out an exemplary registration process (100) in accordance with one particular embodiment. In this embodiment, a program, $P_O$ (107), in original form is stored on a CD-ROM (101). Original program (107) is presumed to be trusted or benign by an administrator of the machine. The benign program is converted to a locally unique form. After being read from a CD-ROM (101), the program is moved into a page of the computer's main memory (102) aligned to a line width of an instruction cache (I-CACHE). In the illustrated embodiment the TRANSFORM function used is an XOR operation (104) used in conjunction with a mask value (103). The mask value used during registration can be stored in a register or other memory. The TRANSFORM converts lines of the original program (107) from their original form into a locally unique form. The resulting transformed lines are written back into a page of memory (105), which may or may not be the same as the original page of memory (102). After the program transformation is complete, the transformed program, $P_T$ (108), in the locally unique form, is stored on the computer's hard disk drive (106).

A benign, trusted or authorized program is a program for which there is some indication that the program is allowed to be executed on the computer. For example, in some embodiments, upon installing a program onto the computer, the user may be prompted to indicate whether the program is an authorized program and therefore allowed to execute on the computer. Of course, in such embodiments it is possible that only an administrative user may have sufficient permission to make such an authorization. In other embodiments, the source of the program may serve as the indication that it is allowed to be executed. For example, particular websites may be designated as trustworthy and therefore any program downloaded from those websites are allowed to be executed. Alternatively, the indication may be based on the identity of the creator of the program. Some creator's may be implicitly trusted, and therefore any program they create may be allowed to execute on the computer. In yet other embodiments, the indication that a program is allowed to execute may be based on credentials associated with a program or its creator. The foregoing examples of various types of indications whether a program is allowed is not exhaustive.

In addition, although FIG. 1 illustrates a CD-ROM as the source of one or more programs, it is to be understood that computer programs can come from many different sources or media. By way of example, but not limitation, programs may be communicated to the computer via a network (e.g., the Internet), wirelessly from a data storage device or computer, or from a USB Flash drive or similar memory device.

In addition, although the TRANSFORM shown in FIG. 1 is an XOR function, it is to be understood that any invertable transform can be used. Examples of possible transforms include, but are not limited to, bit shuffling, opcode substitution, or checksums.

Figure 2:
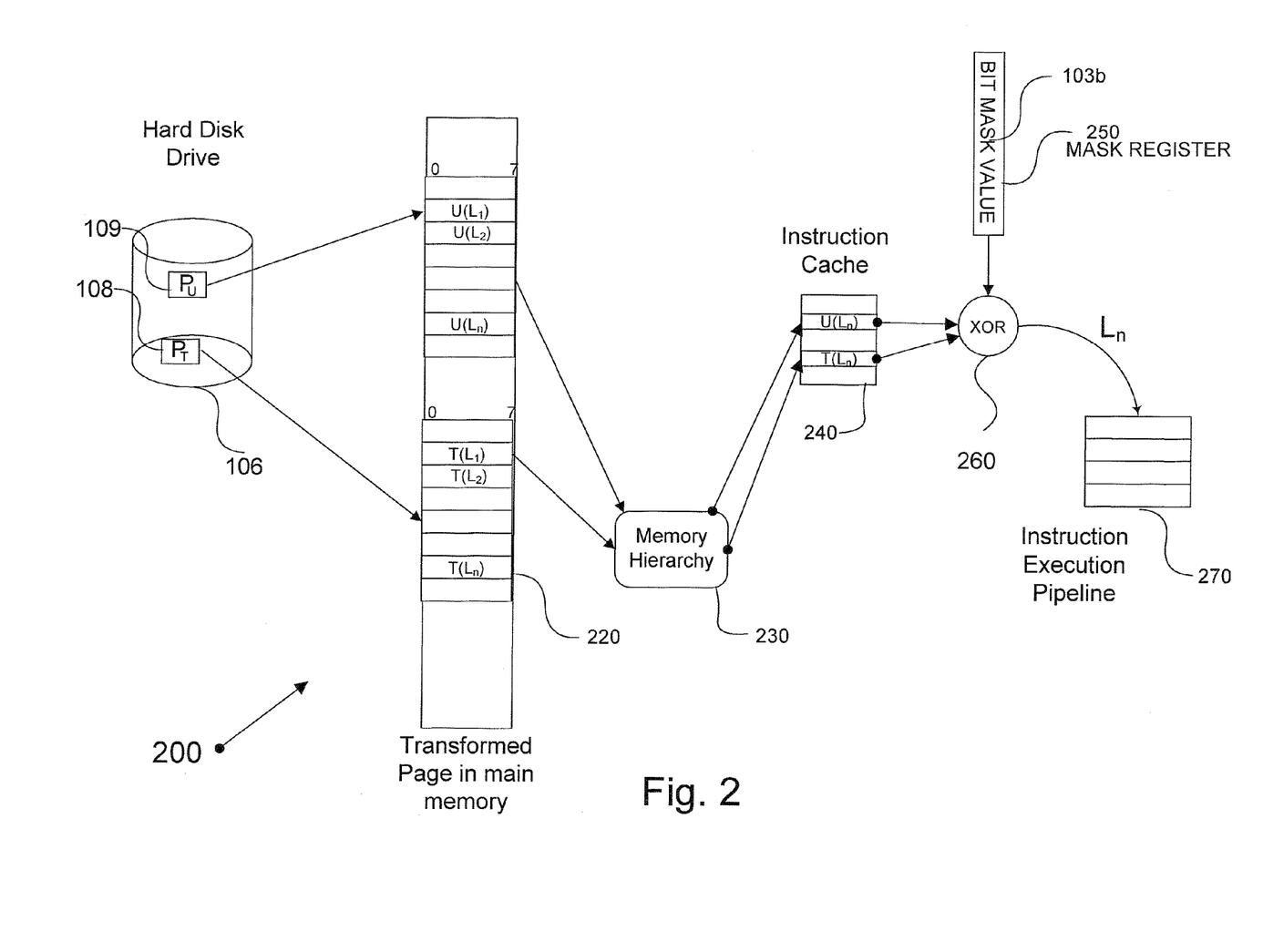
FIG. 2 is a diagram that illustrates an inverse transforming process carrying out an INVERSE TRANSFORM of the TRANSFORM performed in the registration process shown in FIG. 1.

FIG. 2 illustrates an inverse transforming process (200) carrying out an INVERSE TRANSFORM of the TRANSFORM performed in the registration process shown in FIG. 1. First it is assumed that the transformed program, $P_T$ (108), stored on the computer's hard disk drive (106) has been selected for execution. In response, the transformed program (108) is loaded into the main memory of the computer (220) where the bytes of the program are aligned in the same fashion as they were during the registration process (100, FIG. 1). The instructions of the program (108) are loaded through the computer's memory hierarchy (230) and arrive at the computer's instruction cache (240). When the given line of the instruction cache (240) is selected for execution, it is first passed through the INVERSE TRANSFORM, which in this embodiment is an XOR operation (260). The XOR operation (260) exclusively or's the bits of the instructions with a bit mask value (103b) that is stored in a mask register (250). The resultant bit pattern is passed to the instruction execution pipeline (270).

The bit mask value (103b) may or may not be the same as the bit mask value (103a) used during the registration process (100). If the mask value (103b) held in mask register (250) is the same as bit mask value (103a), then the bit pattern presented to the instruction execution pipeline will be the same as the bit pattern of the original program (107) prior to the registration process when transformed program, $P_T$ (108), is inversely transformed. In other words, if the registration bit mask value (103a) is the same as the inverse transform bit mask value (103b) and the program being inversely transformed was transformed in the registration process, then the output of the inverse transforming process (200) is the original program, $P_O$ (107).

With further regard to the mask register (250), the mask register (250) is more generally referred to as a speciation register. The mask register (250) is preferably a protected register, although it is not required to be a protected system register.

In embodiments where the bit mask values (103a) and (103b) are equal, it may be possible to change the bit mask value (103). In addition, in some embodiments there can be multiple sets of corresponding bit mask values used in the registration process (100) and the inverse transforming process (200). To illustrate, some exemplary sets of bit mask values may be:

bit mask value (103a)=11101110, bit mask value (103b)=11101110;
bit mask value (103a)=10101101, bit mask value (103b)=10101101;
bit mask value (103a)=10010110, bit mask value (103b)=10010110;

When multiple sets of corresponding bit mask values are provided, one set of the bit mask values may be selected or set, for example, by the user or by a process executing on the computer. Furthermore, in some embodiments different sets of bit mask values may be applied to different programs. For example, the user may be enabled to associate one bit mask value with a first application program, such as Microsoft Word™, and associate another bit mask value to another application program, such as Mozilla's Firefox™. When multiple sets of corresponding bit mask values are used, the system typically includes a memory that stores the bit mask values in association with the appropriate program(s).

In embodiments where the registration bit mask value equals the inverse transform bit mask value, if the embodiment allows for changing the bit mask value (103), such changes may be made through a user interface of a software program. When the bit mask value (103) changes, the changed value is communicated to the mask register (250). In one embodiment it would be desirable to load the speciation register with a distinct system speciation mask value upon entering a privileged system mode. As such, in these embodiments, the mask register (250) may be either unprotected, or be capable of entering protected and unprotected states. For example, the mask register (250) may only enter the unprotected state when the bit mask value is being changed.

Referring again to the inverse transforming process (200) of FIG. 2, another program, an untransformed program, $P_U$ (109), is stored in the hard disk (106). The untransformed program (109) may be an unauthorized program, or other program for which there is no indication that it is allowed to execute on the computer. For example, perhaps the untransformed program (109) was downloaded from the Internet from an untrusted website. Because the program (109) came from an untrusted website, it did not go through the registration process (100) shown in FIG. 1. As with the transformed program (108), if the untransformed program (109) is selected for execution, the untransformed program (109) automatically goes through the inverse transform process (200). However, because the untrusted program (109) was not previously transformed in the registration process (100), the XOR operation (260) of the inverse transform process (200) alters the bits of the program (109) in a way that very likely renders the program (109) inoperable for it's intended purpose. Thus, the inverse transforming process (200) corrupts or disrupts the untrusted program (109).

As such, in accordance with various embodiments, authorized programs are serially transformed and inversely transformed prior to execution, while only one of the transforming and inversely transforming processes is applied to unauthorized programs. When either of the transform or inverse transform are applied in solo (individually) to an original bit pattern, a bit pattern results that is different from the original bit pattern.

With reference to FIG. 1 and FIG. 2, in some embodiments the registration process (100) is carried out by a preprocessor and the inverse transform process (200) may be carried out by a postprocessor. In such embodiments, the preprocessor typically comprises a software process and the postprocessor comprises hardware logically positioned in the instruction memory hierarchy.

Figure 3:
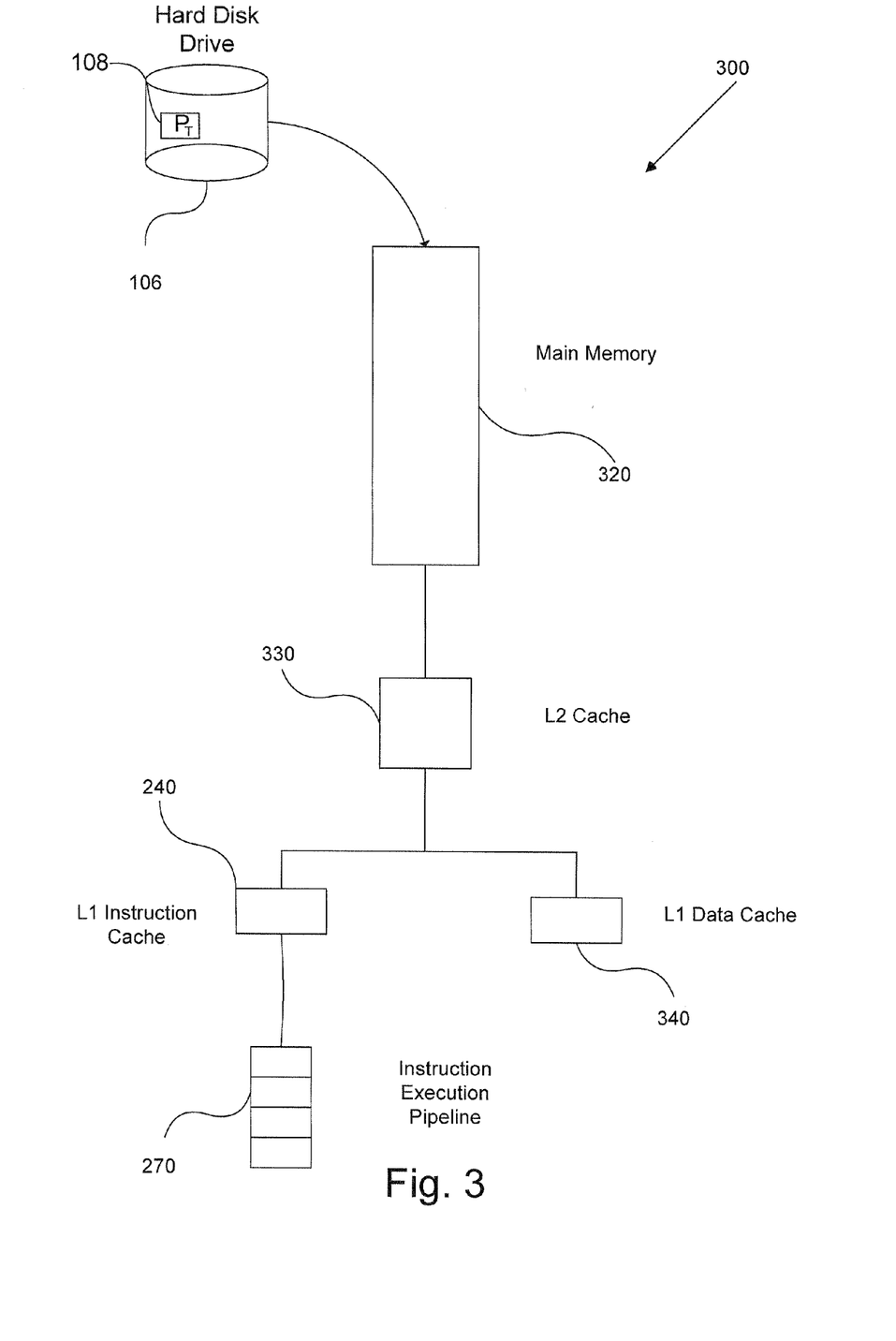
FIG. 3 is a diagram that shows a skeletal version of a memory hierarchy.

FIG. 3 shows a skeletal version of a memory hierarchy. Generally, as one moves up the memory hierarchy, the sizes of the memory component shrink, but the speed of the component significantly increases. The disk drive (106) holding the program (108) is both the largest memory of the computer, but it is also the slowest with respect to operational speed. The main memory of the computer (320) is smaller than the disk in size, but it is significantly faster in access speeds. The Level 2 cache (330) holds a small subset of elements currently in use by the program (called the "working set"). At this point, the memory access stream splits, and the values are used to populate either a data cache (340) or an instruction cache (240).

The values retrieved from the instruction cache are sent to the instruction execution pipeline (270).

Figure 4:
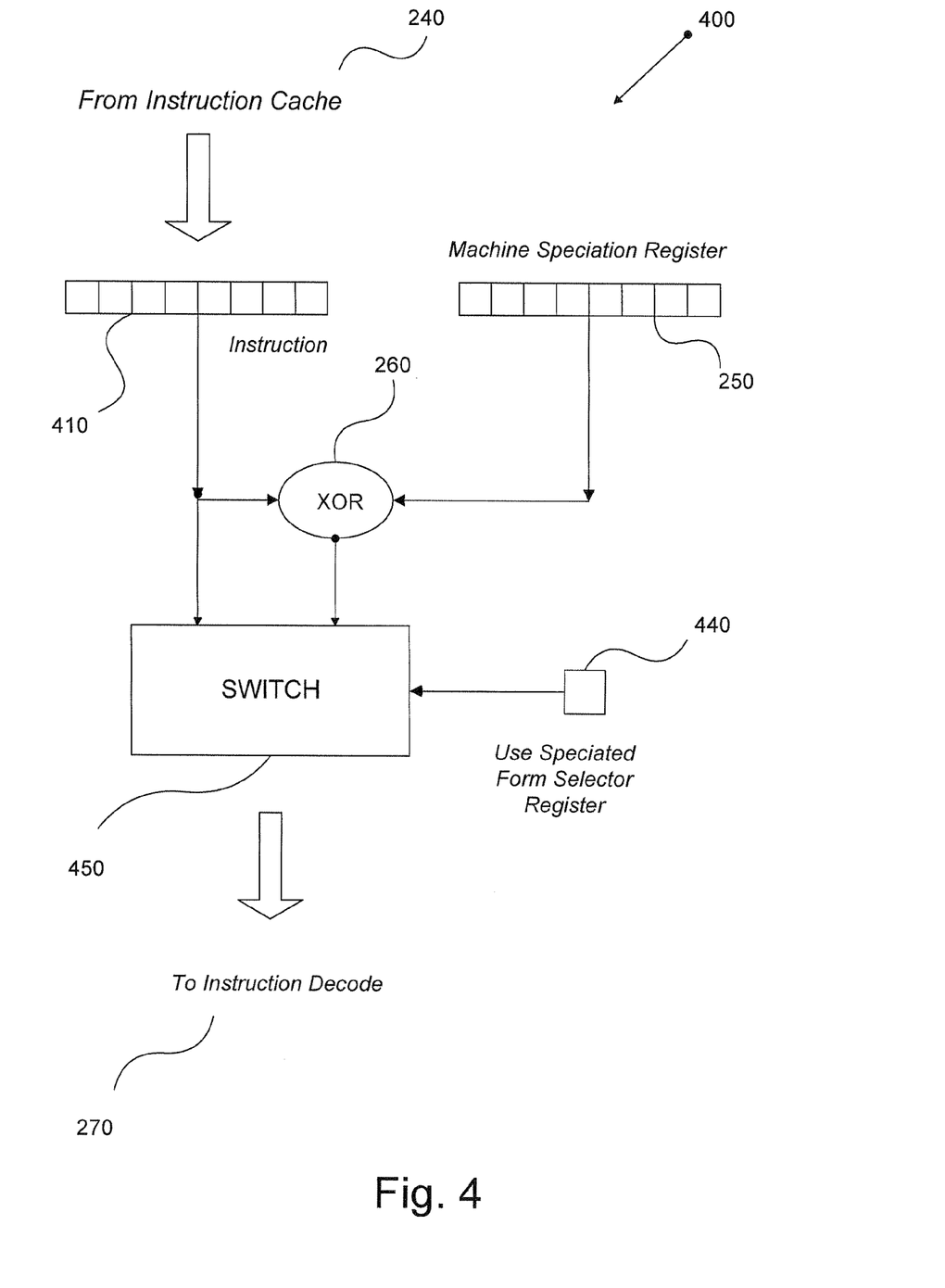
FIG. 4 is a diagram of the INVERSE TRANSFORM function where an XOR operation is used as the delivery mechanism.

FIG. 4 is a detailed diagram of the INVERSE TRANSFORM function where an XOR operation is used as the diversity mechanism. A bit pattern is loaded from the instruction cache (240) and is XORed (260) with the value held in the speciation register (250). Both the raw value of the cache line and the output of the XOR operation are presented to a switch (450). The system bit register use-speciated-form-selector-register (440) is used to select whether the switch (450) will forward to the instruction execution pipeline (270) either the raw bit pattern of the instruction cache, or the XOR transformed value. In some embodiments in which the system can enter different modes, such as a privileged mode and a user mode, the use-speciated-form-selector-register (440) can be set to not use the speciated form only in the privileged mode.

It is to be understood that switch (450) generally represents any type of switching or choosing mechanism. The switch (450) is not limited to any particular type of switching mechanism. For example, the switch (450) can be implemented in computer hardware, such as a transistor in an integrated circuit, or a bit in a memory location.

Figure 5A:
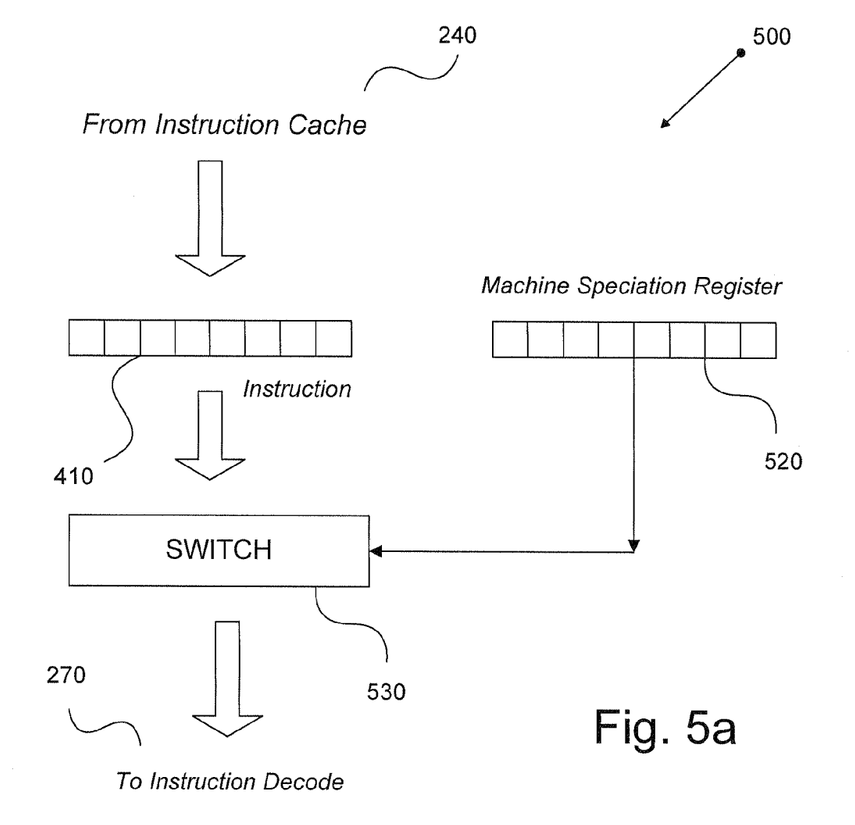
FIG. 5a is diagram of the INVERSE TRANSFORM function where a bit shuffling function is used as the diversity mechanism.

FIG. 5A is a detailed diagram of the INVERSE TRANSFORM function where a bit shuffling function is used as the diversity mechanism. A bit pattern is loaded from the instruction cache (240). The machine speciation register (520) contains a map that directs the crossbar switch (530) to rearrange the byte ordering of the bytes of the instruction(s) of the I-CACHE line (410). The output of the switch is sent to the instruction execution pipeline (270). Note that the machine speciation register (520) of FIG. 5 is different than the speciation register of FIG. 4 (250) because it contains a routing map instead of a simple bit pattern.

Figure 5B:
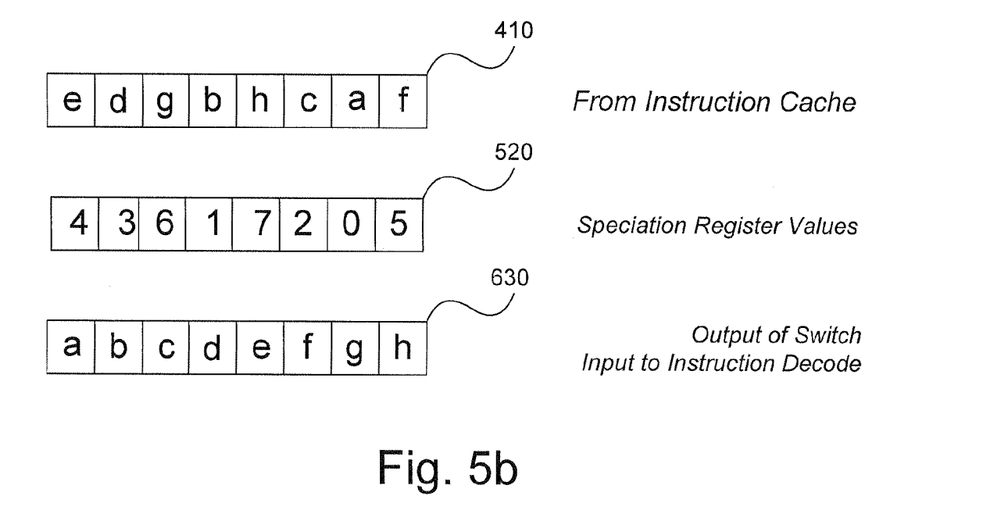

FIG. 5B shows the values of the three byte patterns found in FIG. 5A. The output of the instruction cache (410) is rerouted by the byte map of the speciation register (520). The resultant ordering (630) is sent to the instruction execution pipeline (270). Note that the indexing of these machine registers starts with "0" (not "1"). So, for example, the value of "a" in the input register is routed to the 0-byte of the output register.

Basic Computer Architecture

A computer memory is linear collection of bytes, each of which has a unique index. Usually, the size of the memory of a computer architecture is a power of two, since it is based upon the number of distinct bits that are available for indexing. A "32-bit" machine can address $2^{32}$ bytes of memory (or 4,294,967,296 bytes). A "64-bit" machine can address $2^{64}$ bytes of memory (or 18,446,744,073,709,551,616 bytes). Note that a specific computer may not actually contain all the possible bytes of memory.

A computer architecture's memory is organized into pages of bytes. Again, these pages are a power of two. The page size usually ranges from $2^9$ (512 bytes) to $2^{20}$ (1,048,576 bytes). A common page size is $2^{16}$ (65,536 bytes).

The memory of a computer can hold either DATA or INSTRUCTIONS. Although both of these entities are represented as numbers in the memory, their uses are quite different. In general, data is acted upon by instructions. Most relevant to embodiments described herein are the INSTRUCTIONS that are held by the computer, since the control of malware requires the secure management of the execution of INSTRUCTIONS on the computer.

The CPU of a computer is generally faster than its memory sub-system. Often the CPU is delayed (or stalled) waiting for elements to be copied out of the memory sub-system and into the CPU. To minimize these delays, most computers implement CACHE memories within the chip boundary of the CPU. A CACHE is a local, high-speed memory that buffers the copies of the values from memory locations of main memory in a location that is more rapidly accessible to the CPU.

Most modern computers are organized with a memory hierarchy. The lowest level of the hierarchy may be the computer's disks, the next level is the main memory, and the remaining levels are cache memories. There may be multiple levels of caches between the CPU and the main memory. The structure of a given memory hierarchy is organized to increase the execution speed of programs on that computer. The number of caches, their locations and their sizes do not change the semantics of the executing program. This disclosure describes mechanisms with reference to the cache structure that is closest to the CPU, although the mechanisms described could be applied at any level of the memory hierarchy.

The reference patterns for instruction memory are generally quite different than those for data memory. Instructions are generally fetched from memory in a sequential manner, with periodic non-linear references due to branch or subroutine references. In contrast, data memory references are usually non-linear in nature due to the organization of the data structures of a program.

Given the different memory reference patterns for instruction and data memory, most modern computers are organized with a split cache structure, one for instructions and one for data. Historically, this is called a HARVARD architecture. The instruction cache is often referred to as an I-CACHE, whereas the data cache is often referred to as the D-CACHE. The organization and behaviors of the I-CACHE and D-CACHE are usually different.

A CACHE can hold only a small sub-set of the main memory of the computer. The CACHE is organized as a fixed number of lines. The width of each cache line is also a power of two, generally between $2^2$ (or 4 bytes) to $2^7$ (or 128 bytes). The page size of the computer is an integral multiple of the line size in the cache. For example, if the computer's page size is $2^{16}$ (65,536 bytes), and its cache line size is $2^4$ (16 bytes), then there are $2^{12}$ lines (4096) within each page (16−4=12).
Exemplary Approaches to Malware Disruption One important observation is that there is a direct, fixed relationship between the position of a byte of a line in a cache, and its position within a page. For example, assume that a computer's I-CACHE line size is 8 bytes. Assume that the computer's page size is 1024 bytes. If a value is found in the $5^{th}$ byte of an I-CACHE line, then that value must have been loaded from a page index (and memory location) that satisfies the constraint:

((INDEX mod 8)=5).

To be effective, malware must be able to correctly execute on the target computer. Note that the term "correct execution" refers to the intent of the malware designer based upon the designer's knowledge of the semantics of the standardized instruction set of the given computer. Various embodiments described herein disrupt the semantics of the malware program, and thereby disrupt the malware program's execution. Beneficially, such malware disruption limits the ability of the malware program to achieve the intended goal of the malware program's designer. Upon execution of a disrupted malware program, one possible result may be that the malware program executes to completion but in an innocuous way where there are no harmful effects to the system. More likely, disrupting the malware program will result in an errant program that will be terminated by the supervisory Operating System.

As discussed, embodiments of the present invention speciate computers, while retaining the benefits of standardized computer organization. Some embodiments speciate a computer by encoding the instruction set of programs on any given computer into a form that is specific to that given computer, yet the form can be quickly decoded into the standardized form for the manufactured part. In some embodiments, the decoding occurs quickly enough that the decoding is not apparent to the user during execution of programs on the given computer.

According to various embodiments each computer has associated with it a localized instruction encoding algorithm. In such embodiments, authorized programs are encoded according to the localized instruction encoding but unauthorized programs, including malware, are not encoded according to the localized instruction encoding. In addition, a decoding algorithm is applied to all computers prior to or during their execution. Because unauthorized programs have not been previously encoded according to the localized instruction encoding, "decoding" the unauthorized programs (i.e., applying the decoding algorithm to the unauthorized programs) converts the unauthorized programs into a disrupted form in which they cannot execute properly. Because malware programs are disrupted, they cannot either (1) perform their malware operations or (2) analyze the encoding structure of the given computer to determine the appropriate transform. For this reason, the transforms do not need to be "cryptographically strong,". Rather, the transforms only need to disable one or more operations of the malware program.

A speciated computer can be created by first registering identified programs and encoding identified programs' instructions based upon a scheme that is "relatively" local to the given computer and then decoding those instructions at some point along the instruction memory pathway. The closer the decode phase is to the time of the instructions' actual execution, the less likely it is that unregistered (and presumably rogue) operations can be inserted into instruction execution stream.

Some embodiments include a decoding transformation that takes place immediately after the movement of bytes out of the instruction cache and into the 1st stage of the instruction execution pipeline of CPU. Note that this means that this INVERSE TRANSFORM will be located upon the critical path for the computer's operation. Preferably, the decoding transformation is designed to be fast enough to be transparent to the user.

The most straightforward design for a transform is based upon the cache line. There are a fixed number of bytes within a line and a fixed number of lines within a page. Therefore, a transform specific to bytes within a line can be correctly applied uniformly to the bytes within the lines across a page. This design assumes that a registered program can be loaded into memory with a specified alignment factor. This alignment is necessary to ensure that when the instruction is loaded into the I-CACHE line, that the byte positioning of the instruction is the same as assumed during the registration phase.

There are at least two designs for cache line transforms which easily satisfy speciated encoding of instructions:
  XOR the bits of the cache lines against a mask value
  "Shuffle" the bytes of the instruction cache based upon a
    "routing" register held in the processor.

These two designs are for demonstration purposes only. The goal of speciating computers can be accomplished by any means that makes the structure of the instructions, or instruction memory semantics (including its indexing) "relatively" unique across the installed computer base.

To illustrate how an XOR speciation mechanism might work, assume that the computer has an I-CACHE line size of 8 bytes. This means that each instruction cache line comprises 64 bits. The page size of the computer is not important so long as it is an integral multiple of the line size.

Further assume that the XOR transform is uniformly applied to the program. The INVERSE TRANSFORM in this case is merely the same XOR transform (with the same value) since it is true that (aXORx)XORx=a for all values of "x" and "a".

Typically loaded programs are loaded into a computer's memory with an alignment that is at least based upon the layout of cache lines across a page. To fully protect a computer by speciation, programs would first be transformed (using an XOR operation) by the value to be held in the speciation register and saved onto the computer's disk. When a program initiates execution, its speciation bit mask is loaded into the speciation register within the CPU (or a postprocessor within the CPU). During program execution, the program is first moved from the disk into memory pages on the computer in a fashion that is aligned to the values of the cache line. When a specific instruction is to be executed, the line that contains it is moved from the computer's memory into the I-CACHE of the CPU. When that specific instruction is fetched from the cache line of the CPU, the bits of the line are first XORed with the value of the speciation register. INVERSE TRANSFORM (immediately before instruction decode) would return the instruction byte stream to a form that can be correctly executed by the standardized instruction set CPU.

According to at least one embodiment, the loading and changing of values of the speciation register must be a privileged operation that can only be performed by the protected supervisor program or operating system. As such, in these embodiments, the speciated register is a protected register that is inaccessible to non-privileged processes.

The CPU could also support a mode where the INVERSE TRANSFORM is not applied to the instruction stream so that these instructions are executed as they are directly represented in the computer's memory. A Boolean flag (e.g., use-speciated-form) is used to select either the modified or unmodified form using a switch (see FIG. 1).

The width of the speciation register should be an integral divisor of the instruction cache line width. Of course, the wider the speciation register, the more distinct forms of computers there could be across the installed base, and thus the more difficult the process of determining the speciated value (and the greater the degree of difficulty in writing effective malware). If the speciation register has 32 bits, the number of distinct "species" would be approximately 4 billion. If the speciation register has 64 bits, the number of distinct "species" would be approximately 16 billion-billion.

An alternate method of speciation might "shuffle" the byte ordering in the cache line. For this embodiment, the bytes within a cache line are presented in an order that is different than the order found in main memory. The CPU would contain a "routing" register that specifies the mapping between the "in-memory" ordering of the bytes of the line and the order expected by the instruction execution unit of the CPU. Consider FIG. 2 described above. The speciation register for this embodiment is used to control a (crossbar) switch that transforms the input byte ordering to the output byte ordering. FIG. 3 shows such a mapping. The first byte of the input register (containing the value "e") would be positioned as the fifth slot (byte 4) of the output register. The second byte of the input register (containing value "d") would be mapped to the fourth slot (byte 3) of the output register.

An 8 byte routing register would provide for 8! (40,320) distinct computer "species".

Note that either of these transforms (XOR transform or byte shuffling) can be applied at any point between levels of the instruction memory hierarchy. Typically, the selected transform is applied immediately before the actual instruction execution (after fetching the instruction from a line of the ICACHE). Moreover, the transform can be applied to units larger than a cache line, but, for efficiency's sake, they should be applied across the byte found in one memory access fetch at the specific level of the memory hierarchy. For example, the CPU-local ICACHE might be 8 bytes wide, but another ICACHE level closer to the main memory might have a path width of 16 bytes. In this case, the transform can be applied across those 16 bytes.

Perhaps the most secure method of speciating a computer would be to convert its opcodes to a local form. To register a program, it would be necessary to convert the opcodes of the instructions of the program from the "standard" architectural form to the localized form. A translation map in the decode phase of the instruction execution pipeline would map the localized opcode back into the standardized architectural value.

For example, assume that the "standard" form for an ADD opcodes is 22, but the localized form is 56. To register a program, it would be necessary to convert all ADD opcodes from 22 to 56. To execute the program, you would need to change each opcode 56 back to 22. This assumes that the TRANSFORM and INVERSE TRANSFORM are both "one-to-one" functions, so that both would map each input value to a distinct output value.

The problem with this approach is that the remapping at during instruction decode could add a delay to the "critical path" of program execution, and thus might slow down the computer. Moreover, the additional instruction map could add complexity to the structure of the CPU.

It is possible to achieve the localization of the instruction set, and thus effectively speciate the computer, by remapping a subset of the instruction set. Although any of numerous subsets could be remapped, in a preferred embodiment the appropriate candidate instruction subset to remap includes those instructions that implement the CONTROL operations of a program, namely: BRANCH, CONDITIONAL BRANCH, SUBROUTINE CALL and SUBROUTINE RETURN. By speciating these instructions, a malware program might be able to perform arithmetic operations, for example, but would be unable to reliably implement any decision behavior and/or transfer program control flow.

To implement the localization of these CONTROL operations, it would be desirable to reserve a set of the opcodes of the computer for these control operations. The number of opcode slots should higher than the number of actual operations. Assume, for example, that the computer implements exactly 4 conditional operations (branch, conditional branch, subroutine call and subroutine return). Assume there are 16 possible localized values that these instructions might take. This means that there are (16 choose 4)=16!/12!=16*15*14*13=43,680 distinct speciation values for the given computer. A different speciated value could be used for each program used on the computer. In such embodiments, the speciation register is changed in the CPU before running each program. There are many ways this could be securely accomplished (including maintaining a list of masks within a protected region of the CPU or other location in the computer system). An advantage of using speciation for each program is that the execution rights for a program could be revoked at any time, even during that program's execution. Thus, hardware speciation could be coupled with intrusion detection to disable rogue malware whenever it was detected.

The use of hardware speciation would essentially eliminate the effectiveness of buffer overflow as an intrusion strategy for malware. This intrusion technique uses a carefully crafted parameter string to overwrite control information in a program's local memory to cause the program to branch to a malware routine. Since the malware routine would need to traverse through the instruction memory hierarchy, and thus be transformed by the speciation functions, it is very highly unlikely that the instructions of the malware routine will execute in the manner intended by the malware author.

It is understood that the management of values used to implement the TRANSFORM and its INVERSE must be securely guarded. These values should be accessible to a highly privileged process that executes upon the machine. However, this problem is equivalent to that of the management of encryption keys; a well understood prior art exists for this task.

Embodiments of the invention outlined in this patent can be used in conjunction with other security mechanism to provide more effective control of the target computer. Exemplary software-based speciation strategies are described in detail in the previously filed patent application having Ser. No. 11/319,919, filed on Dec. 27, 2005, and entitled "Creating a Relatively Unique Environment for Computing Platforms", which is incorporated herein by reference for all purposes. Embodiments described in that application can be used to enforce distinct protection domains within a single computer.

Exemplary Computing Device

Figure 6:
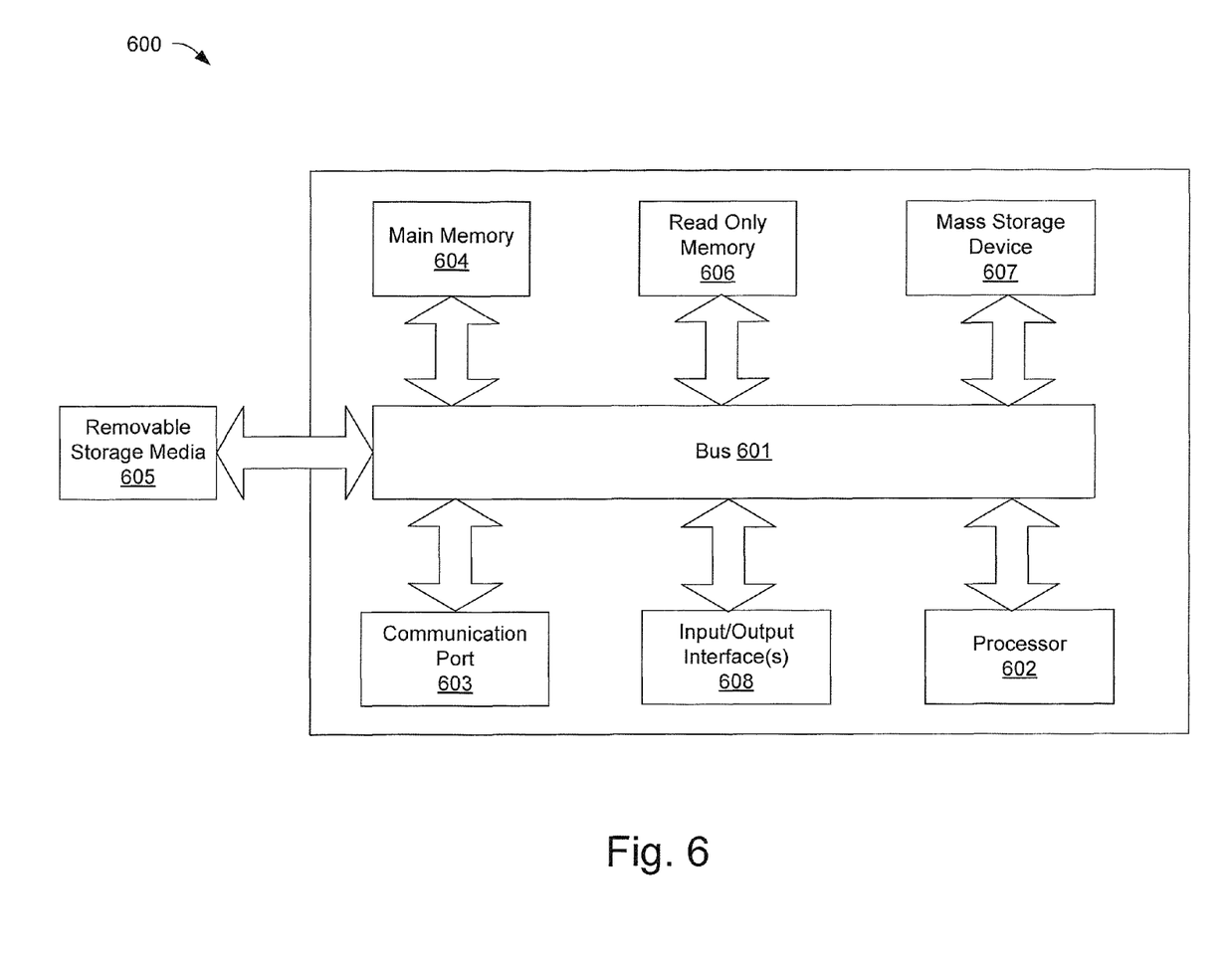
FIG. 6 is a schematic diagram of a computing device upon which embodiments of the present invention may be implemented and carried out.

FIG. 6 is a schematic diagram of a computing device 600 upon which embodiments of the present invention may be implemented and carried out. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 600 includes a bus 601, at least one processor 602, at least one communication port 603, a main memory 604, a removable storage media 605, a read only memory 606, a mass storage 607, and at least one input/output interface 608. Processor(s) 602 can be any know processor, such as, but not limited to, an Intel® Itanium® or Itanium 2® processor(s), AMD® Opteron® or Athlon MP® processor(s), or Motorola® lines of processors. The Processor(s) 602 may include a postprocessor that performs an inverse transform on all programs prior to or during execution of the programs.

Communication port(s) 603 can be any of an RS-232 port for use with a modem based dialup connection, a 10/100 Ethernet port, a Gigabit port using copper or fiber, or a USB port. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage media 605 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Input/Output interface(s) 608 perform input and output operations including, but not limited to receiving computer data and code from input devices and media, and communicating the received data and code onto the bus for storage in memory. For example, an I/O interface 608 may interface with a removable storage media 605, such as a CD-ROM device that has a CD-ROM inserted therein, and which communicates code or data to the I/O interface 608. The I/O interface 608 can then cause the data or code to be transferred to mass storage 605. Prior to being delivered to mass storage, a program may be transformed by a preprocessor as described above. The preprocessor may be hardware or software.

Embodiments of the invention may used in a variety of computing devices, including, but not limited to, client or desktop systems, server computers, mobile computing devices, laptop computers, cell phones, personal digital assistants (PDAs) and other handheld computers, and embedded computers.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

In conclusion, embodiments of the present invention seek to provide novel systems, methods and arrangements for disrupting the operational and distribution capabilities of computer viruses and other malware across modern computer networks and more specifically seek to provide locally unique computing platforms. While detailed descriptions of one or more software implemented embodiments of the invention have been given above, various alternatives, modifications, and equivalents will be apparent to those skilled in the art without varying from the spirit of the invention.

What is claimed is:

1. A computer system configured to execute benign programs while disrupting malicious programs, the computer system comprising:
   a program memory configured to store program code including benign program code and malicious program code;
   an input/output interface configured to receive benign programs and malicious programs from a computer-readable medium, the benign programs containing no malicious program code and the malicious programs containing at least some malicious program code;
   a registration process operable to register the benign programs received by the input/output interface;

a transform function applied by the registration process and its inverse transform function which, when applied serially to an original bit pattern will return the original bit pattern, but when applied in solo will result in a bit pattern which is different than the original bit pattern, wherein the malicious programs enter the program memory without passing through the transform function;

a program code preprocessor configured to apply the transform function in order to transform each benign program received from the computer-readable medium from an architecturally standardized form into a locally-specific form prior to storage of the program code in the program memory;

a program code postprocessor configured to apply the inverse transform function in order to inversely transform all programs prior to their execution, whereby previously transformed benign programs are converted back to the architecturally standardized form and malicious programs are rendered dysfunctional for their intended purpose; and a main processor configured to execute the programs in the architecturally standardized form.

2. The computer system as recited in claim 1 wherein the program code preprocessor comprises a bit mask value, and wherein the transform comprises a bit masking transform for bit masking at least a portion of each benign program using the bit mask value.

3. The computer system as recited in claim 2 wherein the program code preprocessor comprise a software process.

4. The computer system as recited in claim 3 wherein the software process enables a user to associate a different bit mask value with each of a plurality of application programs.

5. The computer system as recited in claim 1 wherein a user is able to designate whether each program is benign or possibly malicious.

6. The computer system as recited in claim 1 wherein the program code postprocessor comprises a switch module controlled by a settable value and is configured to select between untransformed program code and the inversely transformed form of the program code for execution by the main processor.

7. The computer system as recited in claim 1 wherein the transform comprises shuffling bits in the program code to alternate bit positions.

8. The computer system as recited in claim 7 wherein the program code preprocessor comprises a shuffle map that specifies alternate bit positions.

9. The computer system as recited in claim 8 wherein the inverse transform comprises shuffling bits in programs using an inverse shuffle map that specifies original bit positions associated with the alternate bit positions, whereby previously shuffled bits of benign programs will be returned to the bits' original bit positions and bits of not previously shuffled programs will be remain in the alternate bit positions, thereby causing malicious programs to be unable to fulfill their intended purpose.

10. The computer system as recited in claim 2 wherein the bit masking transform comprises applying an EXCLUSIVE OR operation on at least a portion of the program code.

11. The computer system as recited in claim 1 wherein the program code preprocessor comprises an opcode map for use in transforming opcodes from their standardized form to a computer-specific form.

12. The computer system as recited in claim 11 wherein the program code preprocessor transforms benign programs by substituting the opcodes in the benign programs with different codes identified in the opcode map.

13. The computer system as recited in claim 12 wherein the program code postprocessor inversely transforms the executing programs by substituting opcodes in the programs with the associated architecturally standardized opcodes identified in the inverse opcode map.

14. The computer system as recited in claim 12 wherein only a subset of the opcodes in each benign program is substituted with different opcodes and wherein the subset of opcodes includes only architecturally standardized opcodes that effect transfer of control flow when the benign program executes.

15. The computer system as recited in claim 14 wherein the subset of architecturally standardized opcodes correspond to instructions selected from a group consisting of:
a branch instruction;
a conditional branch instruction;
a subroutine call instruction; and
a subroutine return instruction.

16. The computer system as recited in claim 1, further comprising an instruction memory hierarchy, and wherein the postprocessor is logically located within the instruction memory hierarchy.

17. The computer system as recited in claim 1, wherein the postprocessor is integrated within the main processor.

18. A computer-implemented method for disrupting malware in a computer, the method comprising:
receiving a plurality of programs, wherein one or more of the programs is authorized for execution and wherein one or more of the programs is unauthorized for execution;
transforming only each authorized program into a localized form by applying a specified transformation, the transforming being initiated by a registration process, wherein the specified transformation is not applied to the one or more of the programs unauthorized for execution;
at time of execution of each of the plurality of programs, fetching an instruction from the program being executed;
prior to executing the fetched instruction, inversely transforming the fetched instruction by applying an inverse transformation, wherein the unauthorized programs are rendered dysfunctional for their intended purpose by the inverse transformation; and
executing the inversely transformed instruction.

19. The computer-implemented method as recited in claim 18 wherein transforming each of the authorized programs comprises performing an EXCLUSIVE OR operation on at least a portion of the instructions of the authorized programs.

20. The computer-implemented method as recited in claim 18 wherein transforming each of the authorized programs comprises shuffling bits of at least a portion of the instructions of the authorized programs.

21. The computer-implemented method as recited in claim 18 wherein inversely transforming each of the authorized programs comprises converting opcodes of a specified value in the selected program into another opcode of a different value.

22. The computer-implemented method as recited in claim 21 wherein converting opcodes of a specified value comprises accessing an opcode map in memory, wherein the map associates the opcode of the specified value with the opcode of the different value.

23. The computer-implemented method as recited in claim 18 wherein the inversely transforming operation is performed by a program code postprocessor that is part of the computer's memory hierarchy.

24. The computer-implemented method as recited in claim 23 wherein the computer comprises an instruction cache and an instruction execution pipeline, and wherein the postprocessor is logically positioned between the instruction cache and the instruction execution pipeline.

25. The computer-implemented method as recited in claim 23 wherein the program code postprocessor is part of a central processing unit (CPU) of the computer.

26. The computer-implemented method as recited in claim 23 wherein the program code postprocessor comprises a speciation register for use in performing the inversely transforming operation.

27. The computer-implemented method as recited in claim 26 wherein the speciation register is inaccessible to non-privileged programs.

28. The computer-implemented method as recited in claim 18 wherein the transforming comprises shuffling bits from original positions to alternate positions in an authorized program, and wherein inversely transforming comprises shuffling bits from the alternate positions back to the original positions in the authorized program and shuffling bits from original positions to disruptive positions in unauthorized programs.

29. The method as recited in claim 18 wherein the transforming operation and the inversely transforming operation together form an identity function with respect to each authorized program.

30. The method as recited in claim 18 wherein the inversely transforming operation comprises disruptively transforming the fetched instruction if the fetched instruction is from an unauthorized program.

31. The method as recited in claim 30 wherein the disruptively transforming the fetched instruction comprises generating a different instruction that is in the computer's architecturally standardized form.

32. The method as recited in claim 30 wherein the disruptively transforming operation comprises generating a different instruction that is not in the computer's architecturally standardized form.

33. The method as recited in claim 18 further comprising receiving input from a user designating which of the plurality of programs are authorized for execution.

34. The method as recited in claim 26 wherein the transforming operation is performed by a program code preprocessor having a speciation value configured for bit masking bits of each authorized program, the method further comprising:
   setting the speciation value;
   associating the speciation value with a selected application program.

35. The method as recited in claim 34 further comprising communicating the speciation value to the postprocessor.

36. The method as recited in claim 34 further comprising storing the speciation value in the speciation register.

* * * * *